United States Patent Office
3,249,734
Patented May 3, 1966

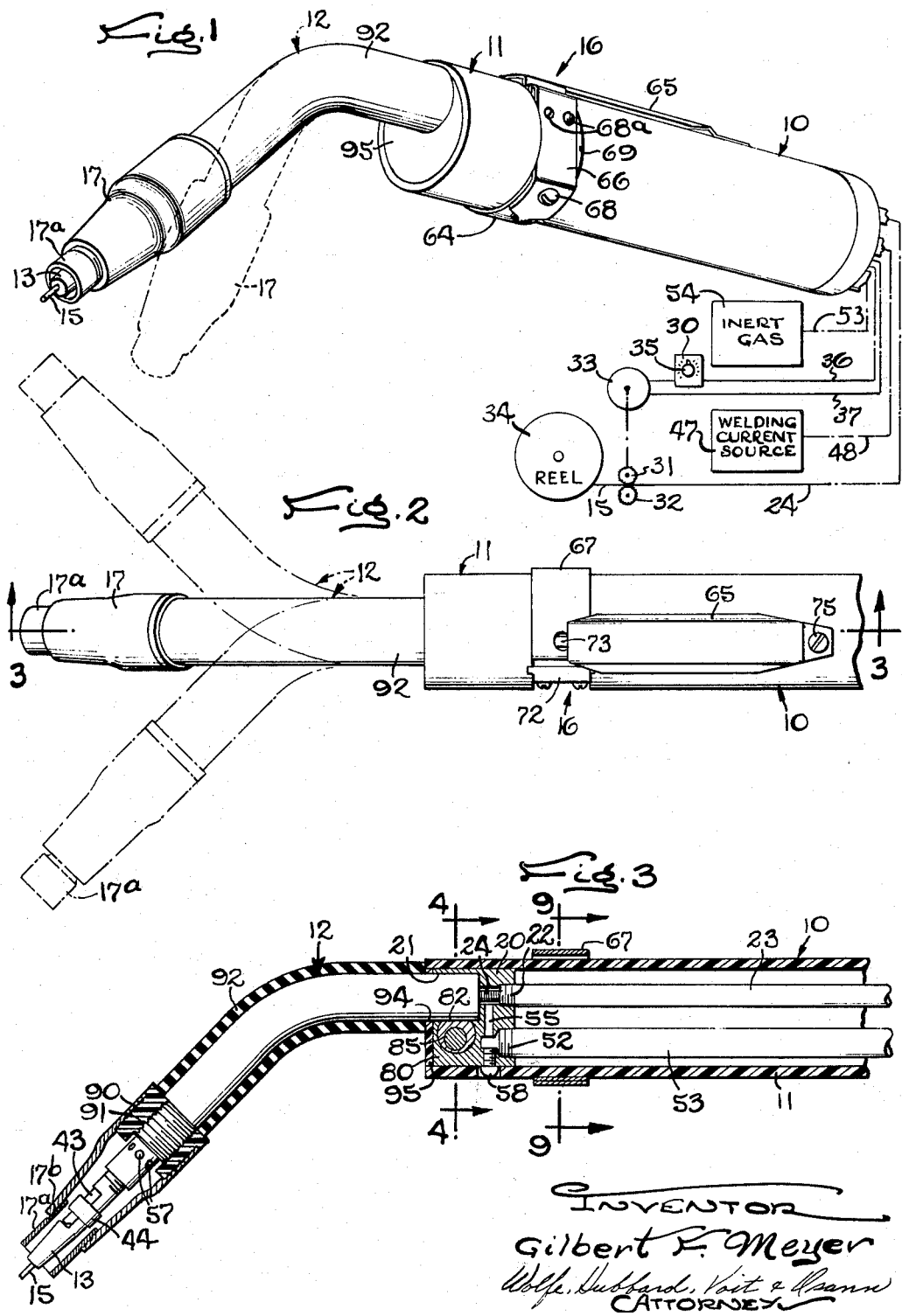

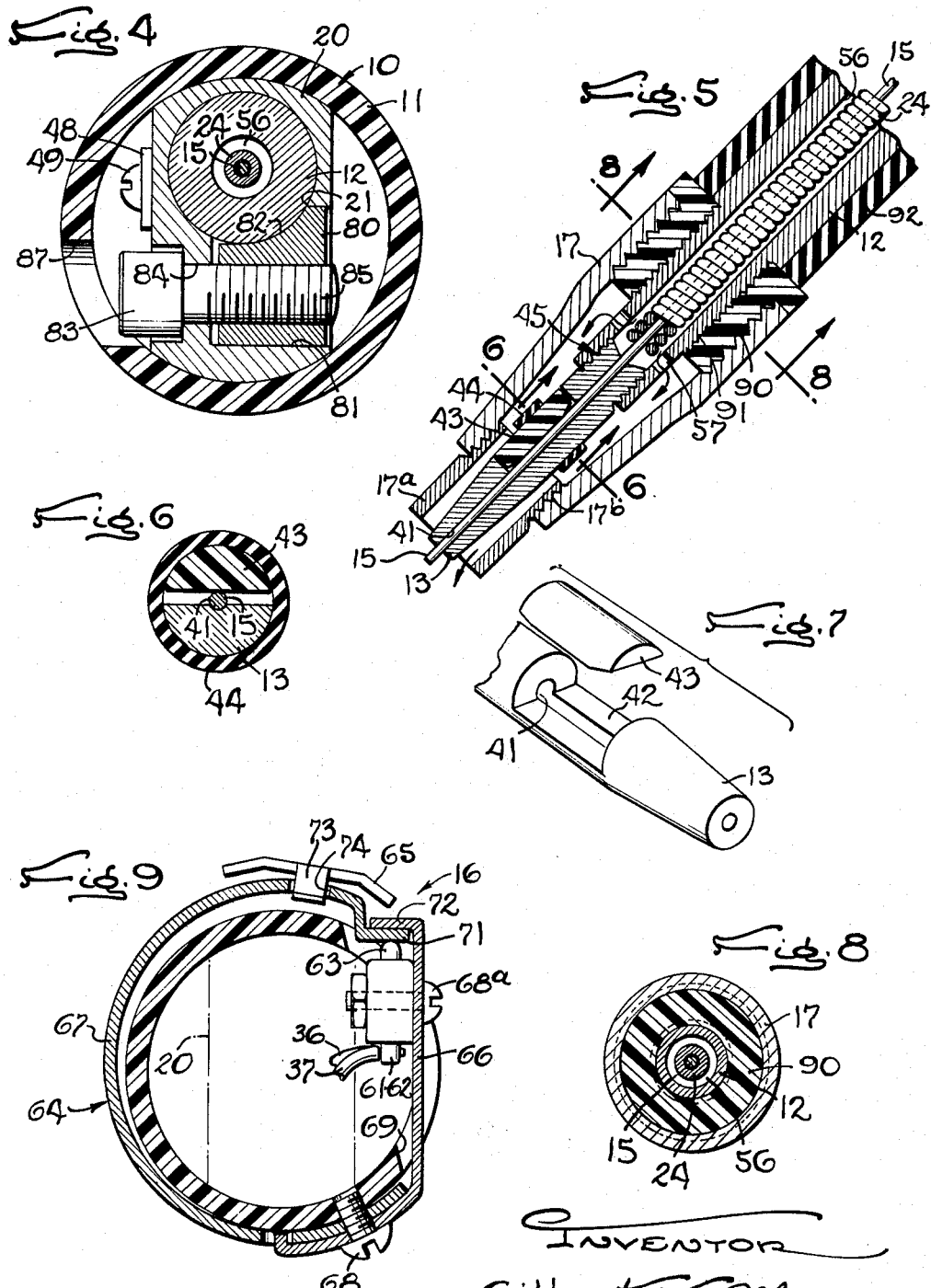

3,249,734
WELDING TORCH FOR CONTINUOUS WIRE FEED
Gilbert F. Meyer, Milwaukee, Wis., assignor to Machinery and Welder Corporation, Skokie, Ill., a corporation of Missouri
Filed Nov. 20, 1963, Ser. No. 325,079
4 Claims. (Cl. 219—130)

The present invention relates to a welding torch and more particulraly to a torch or gun of the continuous wire feed, gas shielded type.

In the welding torches employed in the past for continuous feed of welding wire, a switch has usually been incorporated for the purpose of stopping and starting wire movement. The switch circuit controls a driving motor having provision for maintaining a constant and predetermined wire speed whenever the switch is actuated. Because of the fact that the welding wire is fed continuously, it is theoretically possible for a welder to make long, continuous welds without interruption. However, it is, as a practical matter, impossible to fully exploit the advantages of constant wire feed since the torch or gun must frequently be held in an awkward position because of the necessity for holding the tip of the torch in the proper relation to the work while maintaining control of the switch. This is particularly true where the weld undergoes a frequent change in angle and direction.

It is, accordingly, an object of the present invention to provide an improved welding torch construction for continuous wire feed which is comfortable to use and which may be used for long, uninterrupted stretches without cramping or fatigue. It is a more specific object of the present invention to provide an improved welding torch in which the direction of the nozzle may be easily and quickly adjusted to any desired angle with respect to the wire feed switch. It is an object therefore to provide a torch which enables the switch to be positioned relative to the nozzle for easy hold-down for long periods with a natural gripping action and which permits the nozzle to be shifted from time to time without interrupting the continuity of the work. Stated in other words, it is an object to provide a torch which can be adjusted to the individual comfort and convenience of all operators under all welding conditions.

It is another object of the present invention to provide a welding torch for continuous wire feed which not only permits 360° swiveling of the nozzle but which enables quick and easy substitution of replacement nozzles having a different gooseneck angle, or different length, in establishing the most comfortable and efficient welding conditions.

It is still another object of the present invention to provide a welding torch for continuous wire feed in which the gas cup forming a part of the nozzle at the end of the gun and the gooseneck are electrically insulated so as to prevent inadvertent contact with the workpiece, either during use or between periods of use when the torch is pulled, by its cables, across a workpiece to a new welding location.

It is still another object of the invention to provide a welding torch having extreme versatility and flexibility of use but which is nevertheless of light, simple construction, easily disassembled and of clean functional shape.

Other objects and advantages of the invention may become apparent upon reading the attached detailed description and upon reference to the drawings in which:

FIGURE 1 is a perspective view of a welding torch for continuous wire feed constructed in accordance with the present invention.

FIG. 2 is a top view of the device shown in FIG. 1 and illustrating the swiveling of the gooseneck nozzle.

FIG. 3 is a longitudinal section taken along the line 3—3 of FIG. 2.

FIG. 4 is a transverse section taken along the line 4—4 of FIG. 3 and showing the adjustable friction connection.

FIG. 5 is a detailed fragmentary section taken through the end of the nozzle and gas cup to reveal the details of construction.

FIG. 6 is a section taken along the line 6—6 in FIG. 5.

FIG. 7 is an exploded view showing the wire contact shoe.

FIG. 8 is a transverse section taken along the line 8—8 in FIG. 5.

FIG. 9 is a transverse section showing the switch construction and taken along the line 9—9 in FIG. 3.

While the invention has been described in connection with a preferred embodiment, it will be understood that the invention is not limited to the embodiment shown and that it is intended, on the contrary, to cover the various modifications and alternative constructions included within the spirit and scope of the appended claims.

Turning now to the drawings, there is disclosed in FIG. 1 a welding torch 10 constructed in accordance with the present invention, having a handle 11 formed of a tube of insulating material, having a gooseneck 12 of good conducting metal extending from the front end thereof terminating in a tip 13 from which a continuous length of welding wire 15 is fed under the control of an on-off switch assembly 16 mounted on the handle. Surrounding the tip 13 is a gas cup 17 which causes the wire in the region of the weld to be surrounded by a blanket of inert gas.

In carrying out the present invention there is provided, telescoped within the front end of the handle 11, a connector block 20 (FIGS. 3 and 4) which is formed of good conducting metal. This connecting block includes a forwardly facing socket 21 for receiving the gooseneck 12. Aligned with the socket 21 is a rearwardly facing connection 22 which is preferably threaded for engaging a welding wire conduit 23 having a hollow core 24 which is flexible, being formed of closely spaced combinations of hardened spring wire.

The welding wire 15 is fed from a wire drive unit 30 which per se forms no part of the present invention but which has been diagrammatically illustrated in FIG. 1. The wire drive unit includes a pair of drive rollers 31, 32 driven by a motor 33 and with the wire being supplied from a reel 34. The motor speed is maintained constant by speed control circuitry having a settable control element or knob 35. The motor is turned on and off by motor control lines 36, 37 which are connected to the switch which forms a part of the on-off switch assembly 16. It will be apparent, then, that when the switch 16 is pressed, turning on the motor, the wire 15 will be fed at a constant speed from the reel 34 passing through the conduit 23, the connection 22 on the connector block, the hollow gooseneck 12 and thence to the contact tip 13.

For the purpose of insuring good electrical contact with the wire at the point of exit, the contact tip 13, which is made of good conducting metal such as copper or brass, has a longitudinal bore 41 traversed by a lateral slot 42 within which is received a pressure-applying shoe 43 formed of nylon plastic or other wear-resistant material. For appyling force to the shoe 43, the tip 13 is encircled, as shown, by a heavy plastic band 44 of rubber or the like. To permit renewal of the tip 13, a threaded joint 45 is provided between it and the front end of the gooseneck 12.

For the purpose of establishing a connection to the connection block 20 for flow of welding current, a welding cable 46 is connected to a welding current source 47 with the welding cable terminating in a lug 48 which is secured to the connector block by a machine screw 49.

In accordance with one of the aspects of the present invention, means are provided for conducting inert gas through the connector block 20 and the gooseneck 12 to the gas cup 17 which surrounds the welding wire at the point of exit. In the present construction, this is accomplished by providing a second or gas connection 52 at the rear of the connector block connected to a gas conduit 53 leading to a source of inert gas 54. Such source includes the usual pressure regulator means for controlling the pressure and permitting the rate of gas flow to be adjusted in accordance with the welding conditions.

In carrying out the invention, the connections 22, 52 are placed in communication with one another, for example, by means of a cross port 55 connecting them so that the inert gas which enters via the conduit 53 is conducted into the gooseneck and through the annular space 56 which surrounds the flexible core 24. At the end of the gooseneck a series of ports 57 are provided for feeding the gas from the gooseneck into the interior of the gas cup 17. For the purpose of renewing the gas cup 17 and, if desired, for adjusting the gas distribution at the contact tip 13, the gas cup is provided with an extension 17a having a threaded joint 17b with the gas cup proper. The outer end of the cross port 55 is plugged by means of a screw 58 radially threaded into the outer end of the port 55. The head of the screw registers with an opening 59 formed in the tubular handle, thus serving to lock the connector block in place after it has been telescoped into the front end of the handle.

For the purpose of turning the motor on and off, thereby to control the feed of the welding wire, the switch assembly generally indicated at 16 includes a switch 60 having terminals 61, 62 which are connected to the lines 36, 37 leading to the motor control circuit. The switch 60, which may be of the microswitch type, has a plunger 63. For the purpose of supporting the switch 60 and operating the plunger 63, a novel mounting and actuating means is provided including a girdle 64 which extends about the tubular handle and a switch operator 65 which extends longitudinally along the handle, being coupled to the girdle at the forward end. The girdle, which may be of a stainless steel strip, consists of two portions, a stationary portion 66 and a spring portion 67, both of which are secured by a machine screw 68 as shown in FIG. 9. The portion 66 of the girdle which is relatively rigid is utilized to mount the switch 60, being secured to the latter by a pair of machine screws 68a. For the purpose of housing the switch 60 and for enclosing the switch leads, the tubular handle is preferably slotted as indicated at 69. In order to establish a normally off condition for the switch, the flexible portion 67 of the girdle is outwardly sprung, terminating in a tip 71 which is arranged opposite the switch plunger 63. For limiting the outward movement of the tip 71, it is engaged by a stop 72 which is preferably integrally formed by bending over the end of the strip 66 adjacent the switch.

For coupling together the front end of the switch operator 65 and the girdle member 67, the operator has a lug 73 which is received in a hole 74 formed in the girdle. The rear, or stationary, end of the switch operator is secured to the wall of the tubular handle by a machine screw 75. It will be apparent, then, that by pressing upon the switch operator 65, the girdle member 67 is pressed inwardly, thus actuating the switch plunger 63. When pressure is released, the switch mechanism is immediately restored to the "off" condition illustrated in FIG. 9 with the girdle member 67 upwardly sprung and bottomed on the stop 72. It will be apparent to one skilled in the art that the switch operating mechanism has a number of other advantages, causing it to be well suited to conditions encountered in the field. Since the operator 65 extends along the length of the handle, either a "short" or "long" grip on the handle is effective to operate the switch. When servicing becomes necessary, the entire assembly may be removed simply by removing the machine screws 68, 75.

In accordance with the present invention, the socket 21 formed in the front of the connector block 20 is formed to provide snug frictional sleeve engagement with extensive metal to metal contact with the gooseneck for efficient transfer of welding current and gas to the gooseneck, while permitting rotation of the gooseneck about the sleeve axis so that the gooseneck may occupy, and may be frictionally retained in, any desired angular position relative to the switch operator 45. Thus, I provide a socket having straight, cylindrical walls, which meet with the outer surface of the gooseneck to provide for substantial overlap, or deep-seating of the gooseneck with respect to the connector block, and I further provide adjustable means for permitting the amount of friction between the gooseneck and connector block to be varied. To this end, I employ a friction contact shoe 80 which is received in a bore 81 (see FIGS. 3 and 4) formed in one side of the connector block in communication with the socket. The contact shoe 80, which is preferably formed of hard-drawn copper, has an arcuate surface 82 which conforms to the outer wall of the gooseneck. The friction is varied by a cap screw 83 which is received in a hole 84 formed in the connector block and which has a thread 85 for screwing into the shoe. The mating surface between the shoe and the connector block serves to absorb the reaction force. The cap screw is readily accessible for adjustment purposes through an opening 87 provided in the wall of the tubular handle and which serves to admit an Allen wrench or the like.

It is found that the frictional sleeve joint discussed above performs all of the functions required of it and, in spite of the extreme simplicity of the construction, has a number of inherent advantages. First of all, with regard to transmission of welding current, it is found that the extensive area and good frictional engagement provide a low resistance joint so that the heavy welding current is conducted to the contact tip without any heating whatsoever in the handle itself. It is, moreover, found that the extensive area connection minimizes any leakage of gas so that the gas is efficiently conducted from the conduit 53 to the ports 57 at the end of the gooseneck. The flow of gas, incidentally, performs a cooling function, preventing conduction of heat back into the handle from the region of the weld. Finally, it is found that the sleeve connection permits ready adjustability of the gooseneck about any angle through 360° with respect to the switch operator 65 on the side of the handle. In use, the operator may first position the handle within his hand so that the switch member occupies the most convenient and comfortable position for easy on-off movement by thumb or palm, following which the gooseneck may be rotated so that it occupies the proper position with respect to the workpiece, a position which not only achieves best utilization of the gas, but which provides adequate visibility at the point of welding. As the weld progresses and changes direction, it is a simple matter for the operator to rotate the gooseneck slightly, without necessity for abandoning a comfortable grip on the handle. Thus, the present torch is ideally suited for horizontal, vertical, and overhead welding as well as welding at any slope or angle.

While it is found that the friction sleeve connection is capable of holding the gooseneck securely in place within the handle while maintaining a desired angled position, it is one of the features of the present construction that the gooseneck may be readily disengaged from the handle by a simple axial pull combined with slight twisting action for substitution of a similar gooseneck, but one having a different angle of bend. Such substitution takes but a few minutes and does not require loosening of the screw 83, use of tools or making of an adjustment. It will be noted that the flexible hollow core 24 permanently extending through the connector block easily slides into the gooseneck preventing any binding of the welding wire and automatically centering it for entry into the contact tip of the new gooseneck.

In accordance with one of the features of the present invention, all of the current carrying parts are electrically shielded against accidental contact with the workpiece, thus precluding any harmful flashing in the eyes of the operator or any short circuit and resultant damage to the torch itself. Thus, referring particularly to FIG. 3, an insulated bushing 90 is interposed between the end of the gooseneck 12 and the gas cup 17. This bushing may, for example, be threaded onto the end of the gooseneck as indicated at 91 and the gas cup may be force-fitted in place on the outside of the bushing. Moreover, a flexible insulating covering 92 is provided in the form of a tube of rubber or the like which is telescoped over the metallic gooseneck. Finally, an insulating disc 93 having an offset opening 94 for accommodating the inner end of the gooseneck overlies the connector block 20, neatly enclosing the front end of the tubular handle. Thus, since the contact tip 15 is substantially fully enclosed by the insulated gas cup 17 and its extension 17a, the present torch may be pulled along the workpiece from one welding location to another without bothering to turn off the source of welding current. In other words, it is unnecessary for the operator to go back to the source, which may be remotely located twenty or more feet away, to turn off the current between separated stretches of welding. Nor does the idle torch constitute any hazard to personnel not directly connected with the welding operation.

Because of the multiple functions performed by the connector block 20 and the gooseneck assembly, the entire structure may be made extremely light and capable of being hand-held for an hour or more at a stretch without fatigue. Thus, the torch enables the continuous weld possibilities inherent in a continuous length of wire to be fully exploited. This is to be contrasted with conventional welding setups using short lengths of wire where each change to a fresh piece of wire requires doffing of the welding helmet and in an invitation to the operator to take a break.

The structure, in spite of its many advantages, is inherently inexpensive to construct and easily maintained.

I claim as my invention:

1. In a torch for welding with a continuous length of welding wire having an associated motor for feeding the same at a constant rate together with a source of welding current and source of inert gas, the combination comprising a hollow cylindrical handle of insulating material, a connector block of good conducting metal telescoped in the front end of the handle, said connector block having a forwardly facing cylindrical socket, a hollow tubular gooseneck of good conducting metal seated in said socket, a contact tip at the end of said gooseneck, a welding wire conduit, a connection on the rear of said block aligned with the socket for connecting to the wire conduit for feeding of the welding wire centrally through said gooseneck, a gas conduit, a second connection on the rear of said block adjacent said first connection for connecting to the gas conduit, a gas cup at the end of said gooseneck surrounding said contact tip, said first and second connections being in communication with one another so that gas from the gas conduit flows through said gooseneck into said gas cup for surrounding the welding wire exiting from the contact tip, an electrical connection on said block for connection to the source of welding current, a switch on said handle for controlling the motor and having a switch operator extending lengthwise along the handle, the socket in said connector block being formed to provide snug frictional sleeve engagement with the gooseneck with extensive metal to metal contact for efficient transfer of welding current and gas to said gooseneck while permitting rotation of said gooseneck about the sleeve axis into any desired angular position relative to the switch operator, said socket including a metallic contact shoe bearing on the gooseneck and having an adjusting screw for adjusting the degree of friction to that which will maintain the gooseneck in the desired position.

2. In a torch for welding with a continuous length of welding wire having an associated motor for feeding the same at a constant rate together with a source of welding current and a source of insert gas, the combination comprising a handle of insulating material, a connector block of good conducting metal mounted in the front end of the handle, said connector block having a forwardly facing socket, a hollow tubular gooseneck of good conducting metal seated in said socket, a contact tip at the end of said gooseneck, wire and gas conduit means secured to said connector block for feeding of the welding wire and gas centrally through said gooseneck, a gas cup at the end of said gooseneck surrounding said contact tip, an electrical connection on said block for connection to the source of welding current, a switch on said handle for controlling the motor and having a switch operator extending lengthwise along the handle, the socket in said connector block being formed to provide snug frictional sleeve engagement with the gooseneck with extensive metal to metal contact for efficient transfer of welding current and gas to said gooseneck while permitting rotation of said gooseneck about the sleeve axis into any desired angular position relative to the switch operator, said socket including a metallic contact shoe bearing on the gooseneck and having an adjusting screw for adjusting the degree of friction to that which will maintain the gooseneck in the desired position.

3. In a torch for welding with a continuous length of welding wire having an associated motor for feeding the same at a constant rate together with a source of welding current and source of inert gas, the combination comprising a hollow, cylindrical handle of insulating material, a connector block of good conducting metal telescoped in the front end of the handle, a hollow, tubular gooseneck of good conducting metal frictionally secured to the connector block for electrical and mechanical connection while permitting rotation of said gooseneck about the handle, a contact tip at the end of said gooseneck, means for securing a welding wire conduit to the connector block, means for securing a gas conduit to the connector block so that both welding wire and gas pass through said gooseneck, a motor on-off switch assembly secured to the handle and including a plunger type switch recessed within a slot found in the handle, said on-off switch assembly having a flexible strip of metal surrounding said handle and having an operator portion extending longitudinally of said handle, one end of said strip being secured to said switch and the other end of said strip being arranged opposite the plunger so that when the operator is depressed, the strip is compressed for actuation of the switch.

4. In a torch for welding with a continuous length of welding wire having an associated motor for feeding the same at a constant rate together with a source of welding current and source of inert gas, the combination comprising a cylindrical handle of insulating material, a connector block of good conducting metal recessed in the front end of the handle, said connector block having a forwardly facing socket, an insulating disc having an opening concentric with said socket enclosing the front end of said handle, a hollow, tubular gooseneck of good conducting metal telescoped into and removably secured in said socket, a contact tip for feeding a continuous length of welding wire therethrough, a metal gas cup surrounding said contact tip, a cable for interconnecting the source of welding current to the connector block, an insulating bushing for insulating said gas cup from said gooseneck and a flexible tube of insulation telescoped over said gooseneck with its respective ends adjacent said insulating disc and said insulating bushing to obstruct dislodgement of the disc and so that the current carrying members of said torch are electrically shielded to permit the torch to be drawn along the work surface without interrupting the source of welding current.

(References on following page)

References Cited by the Examiner

UNITED STATES PATENTS

| | | | |
|---|---|---|---|
| 2,128,799 | 8/1938 | Chapman | 219—142 |
| 2,289,938 | 7/1942 | Smith | 219—136 |
| 2,371,945 | 3/1945 | Barbeck | 219—70 |
| 2,465,157 | 3/1949 | Isbell | 219—70 |
| 2,817,749 | 12/1957 | Flood et al. | 219—130 |
| 2,881,305 | 4/1959 | Wojciak et al. | 219—130 |
| 2,952,766 | 9/1960 | Craig et al. | 219—130 |
| 2,981,825 | 4/1961 | Rundell | 219—136 |
| 3,112,392 | 11/1963 | Orr et al. | 219—130 |
| 3,155,811 | 11/1964 | Adamson et al. | 219—130 |

RICHARD M. WOOD, *Primary Examiner.*